United States Patent [19]

Graafland

[11] Patent Number: 4,701,494

[45] Date of Patent: Oct. 20, 1987

[54] PROCESS FOR THE PREPARATION OF WATER-SOLUBLE VINYL SACCHARIDE POLYMERS

[75] Inventor: Teunis Graafland, Amsterdam, Netherlands

[73] Assignee: Shell Oil Company, Houston, Tex.

[21] Appl. No.: 790,905

[22] Filed: Oct. 24, 1985

[30] Foreign Application Priority Data

Oct. 26, 1984 [GB] United Kingdom ............... 8427148

[51] Int. Cl.$^4$ ............................................. C08F 24/00
[52] U.S. Cl. ................................. 524/811; 526/219.5; 526/238.23; 252/8.554
[58] Field of Search ..................... 526/238.23, 219.5; 524/811

[56] References Cited

PUBLICATIONS

Klein, "Entwicklung neuer Polymertypen zur Tertiärförderung von Erdöl, Forschungsbericht 165-2, Sep. 1982, D. Gessellschaft fur Mineralolwissenschaft und Kohlenchemie.

*Primary Examiner*—C. Warren Ivy

[57] ABSTRACT

This invention provides a process for the preparation of water-soluble vinyl saccharide polymers by polymerization of at least one water-soluble monovinyl saccharide monomer in water at a temperature in the range of from 10° C. to 90° C., characterized in that the polymerization is carried out in the presence of an azo-type free-radical initiator and that the process is limited to the polymerization of water-soluble monovinyl saccharide monomer in an amount not higher than 150 kilograms of monomer per cubic meter of water solution. The polymers prepared according to the invention may advantageously be used as thickeners for aqueous solutions in enhanced oil recovery and for water treatment.

23 Claims, No Drawings

PROCESS FOR THE PREPARATION OF WATER-SOLUBLE VINYL SACCHARIDE POLYMERS

BACKGROUND OF THE INVENTION

This invention relates to a process for the preparation of water-soluble vinyl saccharide polymers which have utility, for instance, as polymeric thickeners for aqueous solutions and as water treating agents.

The publication "Entwicklung neuer Polymertypen zur Tertiarforderung von Erdol" (Forschungsbericht 165-2, 1982) of the Deutsche Gesellschaft fur Mineralolwissenschaft and Kohlenchemie describes the preparation and performance of water-soluble vinyl saccharide polymers. Two alternatives are disclosed for the preparation of such polymers: (1) polymerization of a vinyl ester of a monosaccharide, in which the pending hydroxyl groups have been protected, in the presence of a free-radical initiator followed by treatment with acid to liberate the hydroxyl groups to render the polymer water-soluble, or (2) polymerization of a water-soluble vinyl ester of a monosaccharide in water and in the presence of a hydrogen peroxide, potassium persulfate, or ammonium persulfate free-radical initiator. Although the products of these polymerizations are said to be characterized by a relatively high viscosity, it is found that such methods are not suitable for the preparation of materials having viscosities sufficiently great to be useful in many commercial applications. For example, tests have shown that these methods do not produce water-soluble polymers which as a one percent by weight solution in water have a viscosity greater than 2.0 Pa.s at 25° C.

SUMMARY OF THE INVENTION

A method has now been found for the preparation of water-soluble vinyl saccharide polymers which results in aqueous polymer solutions having a viscosity substantially greater than that of like solutions of polymers perpared by conventional methods. The preparation of vinyl saccharide polymers in accordance with the invention is critically dependent upon a polymerization conducted in the presence to free-radical polymerization initiators of the azo type.

Accordingly, this invention is a process for the preparation of water soluble vinyl saccharide polymers which comprises polymerizing in water solution and in the presence of an azo free-radical polymerization initiator at least one water-soluble monovinyl saccharide monomer at a temperature in the range of from about 10° C. to 90° C. and under the provision that the initial concentration of water-soluble monovinyl saccharide monomer in the water solution is not greater than about 150 kilogram per cubic meter.

Aqueous solutions of the products of this process are very viscous at low concentrations. The water-soluble vinyl saccharide polymers are particularly useful as thickeners for aqueous solutions in enhanced oil recovery applications.

DETAILED DESCRIPTION OF THE INVENTION

The invention is suitably applied to the polymerization of monomers which are water-soluble mono- or di-saccharide compounds containing at least one polymerizable vinyl group. This polymerizable vinyl group may be a vinyloxy or a vinylcarbonyloxy group. Examples of such mono-saccharide compounds containing a vinyloxy group include 3-O-vinyl-D-glucose, 6-vinyl-D-galactose and 1-O-vinyl-L-sorbose. Examples of mono-saccharide compounds having a vinylcarbonyloxy group include 3-O-acryloyl-D-glucose, 3-O-methacryoyl-D-glucose, 6-O-acryoyl-D-galactose, 6-O-methacryoyl-D-galactose, 1-O-acryloyl-L-sorbose, 1-O-methacryloyl-L-sorbose, 1-O-acryloyl-mannose and 1-O-methacryloyl-mannose. The monomer in a given process is suitably either a single vinyloxy-compound, a single vinylcarbonyloxy-compound, a mixture of different vinyloxy-compounds, a mixture of different vinylcarbonyloxy-compounds, or a mixture of one or more vinyloxy-compounds with one or more vinylcarbonyloxy-compounds.

Methods for the preparation of the polymerizable water-soluble monosaccharides having a vinyloxy group are known, for instance, from the publication of Reppe et al in Annalen, No. 601 (1956), p. 81 and that of Watanabe and Colon in J. Amer. Chem. Soc., v. 79 (1957), p. 2828. A method for the preparation of the polymerizable water-soluble monosaccharides containing a vinylcarbonyloxy group has been disclosed by Black et al in Makromol. Chem., 117 (1968), p. 210.

Although both the vinyloxy- and vinylcarbonyloxy-compounds are suitable for polymerization in the process of the invention, a preference can be expressed for the use of the vinylcarbonyloxy-compounds. The vinylcarbonyloxy saccharide monomers are more readily polymerized to high molecular weight polymers than are the vinyloxy saccharide monomers. Within the group of preferred water-soluble vinylcarbonyloxy saccharide monomers, particular preference can be expressed for the mono-saccharide esters of methacrylic acid, which will generally be expected to result in the preparation of water-soluble polymers which are more hydrolytically stable than the corresponding acrylic acid esters.

For purpose of the invention, the vinyl saccharide monomer undergoes polymerization in the presence of a free-radical polymerization initiator which is necessarily an azo compound. Particularly preferred for use as the azo initiator are the azonitriles, which include, for instance, the specific compounds 2,2'-azobisisobutyronitrile (AIBN), 2,2'-azobis (2,4-simethylvaleronitrile), 2,2'-azobis(2,3,3-trimethylvaleronitrile), 2,2'-azobis-(2,4,4-trimethylvaleronitrile), 2,2'-azobis(2-cyclopropylpropionitrile), 1,1'-azobis(cyclohexane-1-carbonitrile), 2,2'-azobis(2,4-dimethyl-4-methoxyvaleronitrile), 2-t-butyl-azo-2,4,4-trimethylvaleronitrile, 2-α-naphthylazoisobutyronitrile and 4,4'-dicyano-4,4'-azovaleric acid. More preferred are the azonitrile compounds which characteristically decompose at the temperature at which the polymerization process is carried out. AIBN is considered the most preferred initiator. In general, however, other azo initiators are also suitable for use in the invention, and are exemplified by 2,2'-azobis-(methyl isobutyrate), by alkyl, aryl and cyclic azo compounds such as 1,1'-azobis(1-phenylethane) and halogenated derivatives thereof such as 1,1'-azobis(1-phenyl-1-chloro-ethane).

These azo-compound initiators can be used individually or as mixtures.

Polymerization according to the invention is suitably carried out by contacting the monomer with the initiator in a water medium. In general, this contact may be effected using any of the known techniques, procedures and equipment for polymerization processes. For example, the invention is very suitably practiced in a batch or continuous manner, or in a semi-batch mode with programmed addition of monomer to the polymerization reactor as the reaction proceeds. The polymerization reaction is preferably carried out under an inert atmosphere, e.g., a nitrogen atmosphere.

When the invention is applied to the production of a high molecular weight polymers, the viscosity of the polymerization reaction mixture will increase substantially as the reaction proceeds. In order to prevent the formation of a gel at or near the end of the reaction, it has been found necessary that the quantity of monomer which is subjected to polymerization not exceed about 150 kilograms per cubic meter (kg/m$_3$) of the aqueous reaction mixture. In the case of a batch reaction, the starting concentration of monomer in water solution not exceed this level, while this restriction applies to the total of monomer addition to the reactor in a semi-batch or continuous process. More preferably, the monomer utilization should not exceed about 100 kg/m$_3$.

The amount of free-radical initiator which is suitably used in the invention varies over a wide range. However, in preferred practices in which the process is applied to the preparation of high molecular weight polymers, it is necessary to limit the amount of initiator relative to the amount of monomer. For this reason, the molar ratio of monomer to initiator is preferably at least about 100:1, and is more preferably at least about 500:1. Many of the azo-type free-radical initiators have little if any solubility in water. In such cases, it has been found to be beneficial to introduce them into the polymerization reactor as a solution in a water-miscible organic solvent, such as acetone.

Also for the purpose of maintaining a high molecular weight, and thus a high solution viscosity, of the product water-soluble vinyl saccharide polymers, it is necessary that a limitation be placed on the temperature of the invention. In general, the process is intended to be carried out at a temperature in the range of from about 10° C. to 90° C. In most cases, preference can be expressed for a temperature in the range of from about 20° C. to 70° C., while a temperature in the range of from about 25° C. to 60° C. is considered most preferred. However, it will be understood that such preferences generally represent a compromise between product specifications, process yield, and reaction time.

Polymerization of one or more of the water-soluble monovinyl saccharide monomers will yield a water-soluble vinyl saccharide polymer having a nonionic character. The invention is equally applicable to the preparation of water-soluble vinyl saccharide polymers having an ionic character, which can be effected by carrying out the polymerization in accordance with the invention in the presence of a least one water-soluble polymerizable compound having an ionic group, e.g., a carboxy or sulfo (HOSO$_2$—) group. In one particularly preferred co-polymerization process, the polymerization reaction of the at least one water soluble monovinyl saccharide monomer takes place in the presence of at least one water-soluble $\alpha,\beta$-olefinically unsaturated mono- or dicarboxylic acid. Examples of ionic water-soluble polymerizable compounds suitable for co-polymerization with the monovinyl saccharide monomer(s) in the practice of the invention include acrylic acid, methacrylic acid, maleic acid, itaconic acid (also referred to as methylene succinic acid) and 3-O-methacroyloyl-D-gluconic acid. Methacrylic acid is the most preferred ionic water soluble monomer for co-polymerization with the vinyl saccharide monomer. Although the relative proportions of the vinyl saccharide monomer and the ionic monomer will influence the properties of the ultimate polymer product, they are not critical to the practice of the process of this invention and may suitably vary over a wide range.

When the polymerization reaction has been completed, the polymer product may, if desired, be isolated from any unreacted monomer. For example, the polymer can be precipitated from the reaction mixture upon mixing with an excess of ethanol. Drying of this precipatate yields a white cake of the water-soluble polymer. In the case of the preparation of an ionic polymer, by the co-polymerization of at least one water soluble vinyl saccharide monomer and at least one water-soluble ionic monomer, the dried polymer is preferably dissolved in a large excess of water to which an aqueous solution of base, e.g., an alkali metal hydroxide or ammonium hydroxide, is subsequently added to neutralize the ionic groups, e.g., the carboxy groups. Depending upon the ion content of the polymer, the neutralization reaction will result in a substantial increase in the viscosity of the solution.

The nonionic type of water-soluble vinyl saccharide polymers prepared by the process of this invention may be conveniently used as polymeric thickeners and provide aqueous solutions having high solution viscosity at low polymer concentration. Because the solution viscosity of these polymers is relatively independent of the salinity of the solution, these polymers are highly suited for application in enhanced oil recovery process where the salinity of water present in underground formations frequently has an adverse effect on desired viscosity characteristics. On the other hand, the ionic copolymers which may be produced using the process of the invention are best employed in applications involving aqueous solutions of low salinity, for example for water treatment services or for enhanced oil recovery in low salinity reservoirs. Although the copolymers of ionic monomers with the vinyl saccharide monomers may exhibit higher viscosity in aqueous solution than the polymers of the vinyl saccharide monomers alone, increases in the salinity of the solution often result in a substantial decrease in the viscosity of solutions of the copolymers.

The invention is further described with reference to the following examples, which are intended to illustrate in detail certain preferred embodiments and not to limit its broader scope. In the description of the examples, the following terms shall have the indicated meanings:
AIBN: 2,2'-azobisisobutyronitrile
ABCP: 4,4'-dicyano-4,4'-azovaleric acid
APS: ammonium persulphate
H$_2$O$_2$: hydrogen peroxide
BPO: benzoyl peroxide
MG: 3-O-methacryloyl-D-glucose
MA: methacrylic acid
poly MG/MA: copolymer of MG and MA.

The polymers obtained in the examples are characterized in terms of the viscosity at 20° C. of an aqueous solution containing either 0.1 or 1.0 %w of polymer. Viscosity measurements were conducted using a Brookfield viscometer equipped with an UL-adapter, and the resulting values are expressed as mPa.s.

Preparation of 3-O-methacryloyl-D-glucose (MG)

4 g of 1.2:5.6-di-O-isopropylidene-3-O-methacryloyl-D-glucose (DIMG), 25 mg of p-methoxyphenol and 30 ml 0.5N HCl were introduced into a 100 ml glass reactor equipped with a glass stirrer, a thermometer and a reflux condenser, and subsequently the reactor was placed in an thermostated oil-bath. The reactor contents were heated to 70° C. with continuous stirring, and maintained at this temperature until the contents had become homogeneous (1 to 2 hr.). After cooling to room-temperature, the reactor contents were transferred to a separatory funnel. To remove the p-methoxyphenol, the 3-O-methacryloyl-D-glucose solution was mixed with 50 ml diethyl ether and the resulting mixture was phase separated. This extraction procedure was repeated four times. The aqueous solution was then returned to the 100 ml glass reactor and a pressure slightly below atmospheric was applied to evaporate remaining traces of diethyl ether. Finally the solution was neutralized to a pH of 7 with 1.0N aqueous NaOH. A solids determination indicated that the MG content of the aqueous solution was 6.2%w (equivalent to 0.25 mol/l).

EXAMPLES I-V

Preparation of poly-MG at 40° and 70° C. employing AIBN as the free-radical initiator in different MG to AIBN molar ratio's 50 ml or MG solution (0.25 mol/l) prepared as described hereinabove was introduced into a 100 ml glass reactor and flushed with $N_2$ to remove any dissolved oxygen. Subsquently 250 μl acetone containing a predetermined amount of AIBN was introduced. The quantity of AIBN in each case was that calculated to give the MG to AIBN molar ratios indicated in Table I. The reactor contents were heated with the aid of a thermostated oil-bath to either 40° or 70° C., and, with moderate stirring and a slight $N_2$ purge, maintained at this temperature for 48 hours. Upon termination of the polymerization reaction the reactor contents were cooled to room temperature and poured out under continuous stirring into approximately 150 ml ethyl alcohol, whereupon the poly-MG was precipitated. After removing the liquid phase the residue was dried under sub-atmospheric pressure at 50° C. to a constant weight. The ultimate products were white, water-soluble powders. The viscosities of the different aqueous solutions prepared from these poly-MG polymers are reported in Table I.

TABLE I

| | | Viscosity Polymerization temperature (°C.) | | |
|---|---|---|---|---|
| | | 40 | 40 | 70 |
| | MG to AIBN | Polymer Concentration (% w) | | |
| Example | Molar Ratio | 0.1 | 1.0 | 1.0 |
| I | 100:1 | — | <2 | <2 |
| II | 500:1 | 2.0 | 240 | 2.7 |
| III | 1000:1 | 5.2 | 293 | 4.0 |
| IV | 2500:1 | 2.5 | 446 | 5.9 |
| V | 10000:1 | — | — | 12.8 |

EXAMPLE VI-IX

Preparation of poly-MG at different polymerization temperatures employing AIBN and ABCP, respectively, at a MG to initiator molar ratio of 1000:1.

50 ml of a MG solution (0.25 mol/l) prepared as described hereinabove was introduced into the 100 ml glass reactor and flushed with $N_2$ to remove any oxygen. Then, 250 μl of an aqueous ABCP solution or 250 μl of an acetone solution of AIBN were introduced, both solutions containing that amount of free-radical initiator necessary for the MG to initiator molar ratio of 1000:1. With the aid of a thermostated oilbath the reactor contents were heated to the temperature indicated in Table II, and, with moderate stirring and a slight $N_2$ purge, maintained at this temperature for 48 hours. Thereafter, the reaction product was treated in the same manner as described for Example I-V. The viscosities of the aqueous solutions prepared from these MG polymers are given in Table II.

TABLE II

| | Polymerization | Viscosity Initiator | |
|---|---|---|---|
| Example | Temperature, °C. | AIBN | ABCP |
| VI | 85 | 3.1 | 3.4 |
| VII | 65 | 4.7 | 3.6 |
| VIII | 55 | 28.4 | — |
| IX | 40 | 293 | 12.1 |

COMPARATIVE EXPERIMENTS A-D

Preparation of poly MG at different polymerization temperatures employing APS, $H_2O_2$ and BPO, respectively, at a MG to initiator molar ratio of 1000:1

These experiments were carried out according to the procedure described for Examples VI-IX. The APS and $H_2O_2$ initiators were added to the reactor contents as aqueous solutions containing 1 g initiator/liter and the BPO was added as a solution in 250 μl acetone. The viscosities of the aqueous solutions prepared form these MG-polymers are given in Table III.

TABLE III

| Comparative | Polymerization | Viscosity Initiator | | |
|---|---|---|---|---|
| Experiment | Temperature, °C. | APS | $H_2O_2$ | BPO |
| A | 85 | 2.7 | 5.1 | 3.0 |
| B | 65 | 2.0 | 2.7 | 2.3 |
| C | 55 | 2.3 | 5.8 | 3.1 |
| D | 40 | 4.0 | — | 5.1 |

EXAMPLES X-XII

Preparation of MG/MA copolymers

Aqueous solutions of MG prepared as described hereinabove were mixed with aqueous MA solutions (0.25 mol MA/liter) to produce solutions having MG to MA molar ratios of 9:1, 6:4 and 3:7, respectively. In each case, 50 ml of the thus obtained solution were introduced into the 100 ml glass reactor and flushed with $N_2$ to remove any oxygen. Then 250 μl of an acetone solution of AIBN, containing sufficient AIBN for a monomer to AIBN molar ratio of 2500:1, was introduced into each of the solutions. With the aid of a thermostated oilbath the reactor contents were heated to 40° C. with moderate stirring and a slight $N_2$ purge and maintained at this temperature for 48 hours. Upon termination of the polymerization the reactor contents were cooled to room temperature and poured out under continuous stirring into approximately 150 ml alcohol, whereupon the MG/MA copolymer was precipitated. After drying, the MG/MA copolymer was dissolved in 250 ml water and the carboxylic acid groups were carefully neutralized employing an aqueous 1N NaOH solution. Subsequently the resulting solutions were poured out in 200 ml ethyl alcohol and the obtained precipitate was dried under sub-atmospheric pressure at 50° C. to constant weight. Aqueous solutions were prepared containing 1000 ppm of the respective neutralized MG/MA copolymers and the viscosity of these solutions was determined. Viscosity measurments were also conducted after increasing amounts of NaCl (in percent by weight, %w) had been added to said solutions to arrive at solutions having NaCl contents as indicated in Table IV. This table also reports the viscosities of aqueous solutions containing 10000 ppm of MG polymer of Example IV, measured at different NaCl contents.

TABLE IV

| Example | X | XI | XII | IV |
|---|---|---|---|---|
| MG/MA molar ratio | 9:1 | 6:4 | 3:7 | poly MG |
| Polymer concentration % w | 0.1 | 0.1 | 0.1 | 1.0 |
| NaCl Concentration % w | | Viscosity | | |
| 0 | >100 | 44.7 | 93 | 582 |
| 0.1 | 8.4 | 11.6 | 7.1 | 446 |
| 1.0 | 4.0 | 3.6 | 3.0 | 397 |
| 3.0 | 2.8 | 2.0 | 2.3 | 443 |
| 10.0 | — | — | — | 555 |

I claim as my invention:

1. A process for the preparation of water soluble vinyl saccharide polymers which comprises polymerizing in water solution and in the presence of an azo free-radical polymerization initiator at least one water-soluble monovinyl saccharide monomer, wherein the saccharide portion of the monomer is a mono- or di-saccharide, at a temperature in the range of from about 10° C. to 90° C. and under the provision that the total amount of water-soluble monovinyl saccharide monomer polymerized is not greater than about 150 kilograms of monovinyl saccharide monomer per cubic meter of the water solution.

2. The process according to claim 1, wherein the azo free-radical initiator is an azonitrile compound.

3. The process according to claim 2, wherein the azonitrile compound is 2,2'-azobisisobutyronitrile.

4. The process of claim 1, wherein the total amount of the water-soluble monovinyl saccharide monomer polymerized does not exceed about 100 kilograms per cubic meter of the water solution.

5. The process according to claim 2, wherein each of the monovinyl saccharide monomers is selected from the group consisting of mono-methacryloyl saccharide monomers and mono-acryloyl saccharide monomers.

6. The process according to claim 5, wherein the monomer is 3-O-methacryloyl-D-glucose.

7. The process of claim 3, wherein the monomer is 3-O-methacryloyl-D-glucose.

8. The process of claim 1, wherein the at least one water-soluble monovinyl monomer is co-polymerized with a least one water-soluble $\alpha,\beta$ olefinically unsaturated mono- or dicarboxylic acid.

9. The process of claim 8, wherein the $\alpha,\beta$ olefinically unsaturated mono- or dicarboxylic acid is methacrylic acid.

10. The process of claim 2, wherein the at least one water-soluble monovinyl saccharide monomer is co-polymerized with at least one water-soluble $\alpha,\beta$ olefinically unsaturated mono- or dicarboxylic acid.

11. The process of claim 10, wherein the $\alpha,\beta$ olefinically unsaturated mono- or dicarboxylic acid is methacrylic acid.

12. The process of claim 5, wherein the at least one water-soluble monovinyl saccharide monomer is co-polymerized with at least one water-soluble $\alpha,\beta$ olefinically unsaturated mono- or dicarboxylic acid.

13. The process of claim 12, wherein the $\alpha,\beta$ olefinically unsaturated mono- or dicarboxylic acid is methacrylic acid.

14. The process of claim 1, wherein the molar ratio of water-soluble monomer to azo free-radical initiator is at least about 100:1.

15. The process of claim 2, wherein the molar ratio of water-soluble monomer to azo free-radical initiator is at least about 100:1.

16. The process of claim 5, wherein the molar ratio of water-soluble monomer to azo free-radical initiator is at least about 100:1.

17. The process of claim 15, wherein the molar ratio of water-soluble monomer to azo free-radical initiator is at least about 500:1.

18. The process of claim 16 wherein the molar ratio is at least about 500:1.

19. The process of claim 7, wherein the molar ratio of water-soluble monomer to azo free-radical initiator is at least about 500:1, and the temperature is in the range from about 20° to 70° C.

20. The process of claim 17, wherein the temperature is in the range of from about 20° to 70° C.

21. The process of claim 18, wherein the temperature is in the range of from about 20° to 70° C.

22. The process of claim 21, wherein the at least one water-soluble monovinyl saccharide monomer is co-polymerized with at least one water-soluble $\alpha,\beta$ olefinically unsaturated mono- or dicarboxylic acid.

23. The process of claim 22, where the $\alpha,\beta$ olefinically unsaturated mono- or dicarboxylic acid is methacrylic acid.

* * * * *